United States Patent [19]
Layne et al.

[11] Patent Number: 6,125,995
[45] Date of Patent: Oct. 3, 2000

[54] EXTERNAL GUIDE ASSEMBLY FOR REDUCING CONVEYOR BELT DRAG

[75] Inventors: James L. Layne, Bowling Green; Wendell S. Bell, Smiths Grove; Michael D. McDaniel; Mark T. Johnson, both of Glasgow, all of Ky.

[73] Assignee: Span Tech LLC, Glasgow, Ky.

[21] Appl. No.: 09/131,587

[22] Filed: Aug. 10, 1998

[51] Int. Cl.[7] ............................ B65G 39/16; B65G 13/02
[52] U.S. Cl. ............................................ 198/842; 198/831
[58] Field of Search .................................... 198/831, 840, 198/842

[56] References Cited

U.S. PATENT DOCUMENTS

| | | | |
|---|---|---|---|
| 1,805,430 | 5/1931 | Rowe | 198/840 |
| 1,817,373 | 8/1931 | Hopkins | 198/842 |
| 2,150,320 | 3/1939 | Edwards . | |
| 3,094,206 | 6/1963 | Stewart et al. . | |
| 3,854,575 | 12/1974 | Fraioli, Sr. . | |
| 3,946,857 | 3/1976 | Fraioli, Sr. . | |
| 3,951,256 | 4/1976 | Gurewitz . | |
| 4,227,610 | 10/1980 | Gerdes et al. . | |
| 4,276,980 | 7/1981 | Oizumi . | |
| 4,576,277 | 3/1986 | Park et al. . | |
| 4,893,709 | 1/1990 | Schroeder et al. . | |
| 4,953,693 | 9/1990 | Draebel . | |
| 5,031,757 | 7/1991 | Draebel et al. . | |
| 5,038,925 | 8/1991 | Chrysler . | |
| 5,415,273 | 5/1995 | Peterson | 198/831 |
| 5,573,105 | 11/1996 | Palmaer . | |

Primary Examiner—Christopher P. Ellis
Assistant Examiner—Mark A. Deuble
Attorney, Agent, or Firm—King and Schickli, PLLC

[57] ABSTRACT

An external guide assembly for reducing the frictional drag force acting on a side-flexing modular link conveyor belt, particularly along curves or bends in the conveyor system. The guide assembly is formed from one or more roller assemblies, each having first and second rollers that provide external bearing surfaces for the forward and return runs of the belt. The rollers prevent the belt from drifting to the inside of the curve, and thus serve to reduce the frictional drag force between the belt and the guide rail on the outside of the curve. To form the guide assembly, pairs of articulated members interconnect the roller assemblies and allow the relative angular position of each to be selectively adjusted for mounting along any curve. The rollers may optionally include a peripheral lip which provides additional support for the guide links of the belt.

13 Claims, 2 Drawing Sheets

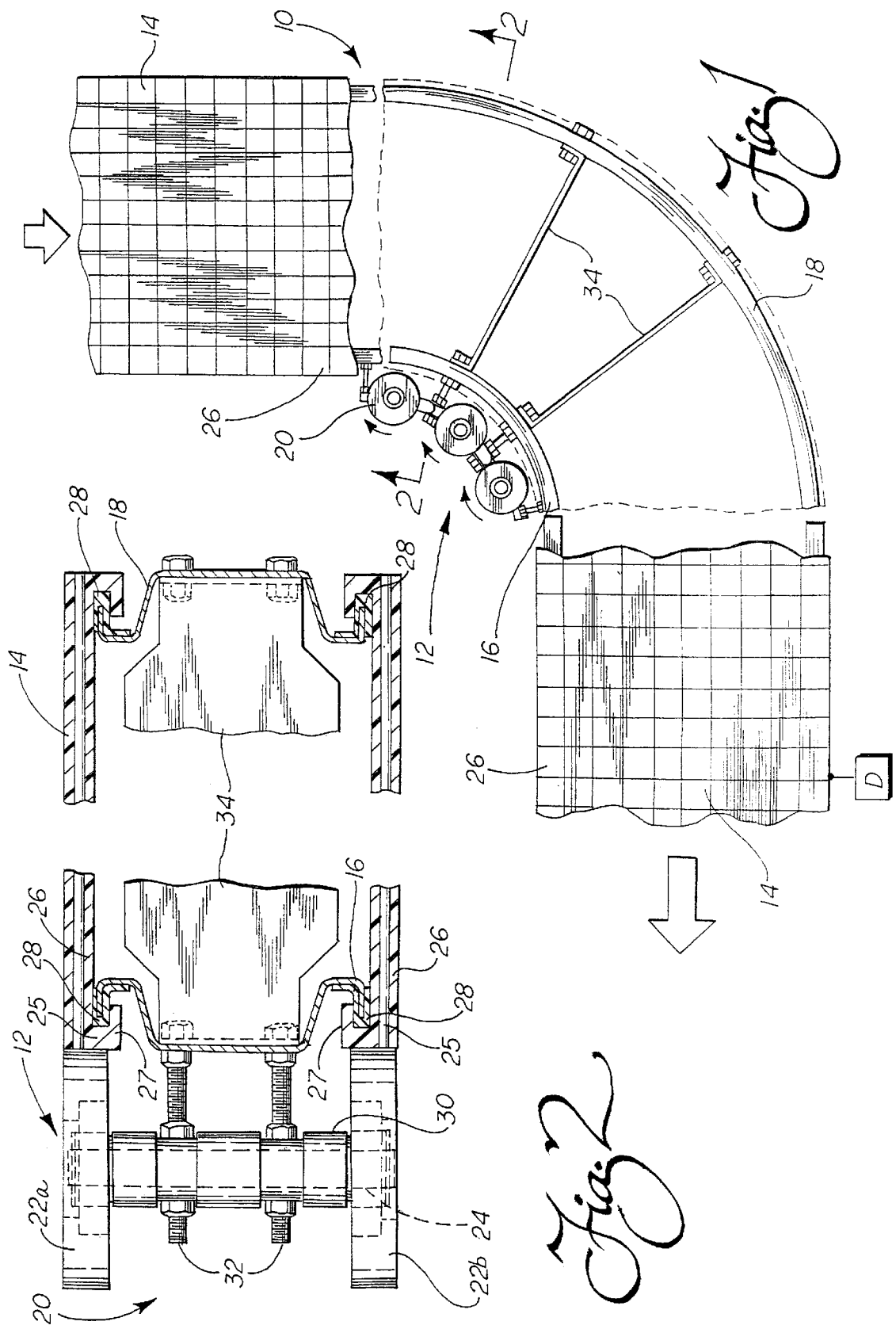

EXTERNAL GUIDE ASSEMBLY FOR REDUCING CONVEYOR BELT DRAG

TECHNICAL FIELD

The present invention relates generally to conveyor systems and, more specifically, to an external guide assembly for reducing the frictional drag force acting on the conveyor belt, particularly along curves or bends.

BACKGROUND OF THE INVENTION

In many modem production facilities, conveyor systems play an integral role in moving articles in process from location to location. Such systems are of particular benefit in the food processing and article packaging industries, where it necessary to transport articles to and from different areas of the production facility to undergo various manufacturing/packaging operations. Due to constraints, such as limitations in floor space, alterations in the direction of travel of the belt must be made by providing curves or bends in the conveyor system. This permits the movement of articles in virtually any direction required or to any specific location in the facility.

With regard to the use of such curves or bends, one significant problem encountered is a substantial increase in the drag force experienced by a modular link conveyor belt, particularly as linear speed increases. It is known that when such a side-flexing conveyor belt rounds a curve or bend, the inner guide or side links compress and the outside guide links expand relative to one another. This simultaneous expansion and compression that also extends to the links making up the body of the belt, places the belt in lateral tension along the radius of the curve. Such tension has the deleterious effect of causing the outer guide links to press against the outer guide rail (which is usually a curved, stainless steel channel). Contact between these links traveling at a high speed and this channel create various "hot spots." As the linear speed of the belt is increased, a concomitant increase in the frictional drag force and related heat generation occurs. Left unchecked, this heat will eventually cause the plastic depending arm of the side link to soften, which can lead to system failure.

Even when operating at lower speeds, this frictional drag serves to reduce system efficiency, as more power is required to overcome this force. Additionally, the side links of the conveyor belt wear more rapidly, which further increases the incidence of link or belt failure. These difficulties inevitably lead to costly production downtime.

Conventional attempts to reduce this troublesome drag force have not been particularly successful. For instance, providing a constant source of lubrication to the curved guide rails can temporarily reduce friction and the resulting drag force. However, the presence of industrial lubricants is undesirable for many production operations, such as food processing, as the food product is subject to contamination. Additionally, lubricants readily trap loose food product and create an unsanitary residue that provides a breeding ground for bacteria or the like. Furthermore, the frequent washing of the system required to meet governmental regulations will necessitate re-application of the lubricant. Thus, even if the lubricant is ruled safe to be around the food product, the cost of such frequent re-application to the rails is prohibitive.

One early proposal for reducing the deleterious drag force is taught in U.S. Pat. No. 3,094,206 to Stewart. The system described therein includes a flexible wire conveyor belt having a pair of centrally-located depending legs with shoulders. The shoulders track along a series of rollers secured near the center of the conveyor frame. While this proposal attempts to reduce the drag force by substituting rollers for the conventional passive or static guide rail, it is apparent that such a design lacks the stability that is required in modem operations, especially during high speed belt operation. Specifically, the presence of a single guide rail in the center fails to consistently maintain the belt flat, which permits the belt edges to flex upwardly and away from the conveyor support frame.

Modem efforts to improve the tribological characteristics in modular-type conveyor systems have moved away from the teaching of the '206 patent and instead have sought to alleviate the problem by redesigning the conveyor belt itself. Most, if not all, of such proposals involve the attachment of rollers directly to the underside of the belt to reduce the drag force. During operation, these rollers track along one or more passive guide rails in an attempt to guide the belt along the curve with less friction. For example, U.S. Pat. No. 5,573,105 to Palmaer discloses a modular link conveyor belt having a plurality of rollers carried under the belt. These rollers also engage a center rail. A similar example of such a design is U.S. Pat. No. 5,038,925 to Chrysler, which teaches the use of split rollers mounted along the peripheral edge of the conveyor belt for engaging a passive guide rail.

While such proposals offer some improvement over earlier approaches, such as the concept of applying a lubricating substance, several limitations remain. The complexity and expense of providing a conveyor belt with rollers is the main drawback, since the cost of construction more than doubles. Furthermore, with the number of rollers increasing by ten/twenty fold or more, the chances of failure leading to downtime are greatly increased. Also, from a sanitary viewpoint, these extra rollers increase the problem of cleaning the belt to meet governmental standards.

Rather than placing rollers on the underside of the belt, still others propose similar modifications along the exterior of the conveyor belt. For example, in U.S. Pat. No. 3,946,857 to Fraioli, Sr., a series of rollers are attached along the peripheral edges of the conveyor belt for tracking along a passive guide rail. It should be readily apparent from viewing this proposed design that similar limitations remain; namely, complexity and cost of design, increased incidence of belt failure, and complicated cleaning requirements.

Thus, a need exists for a side flexing, modular conveyor system with improved operating characteristics, particularly with a view toward reducing or substantially eliminating the drag force experienced by the belt as a curve or bend is traversed. Such an improved system would be both simple in design and inexpensive to construct and maintain. Furthermore, the system would provide the belt with improved stability to ensure that horizontal curves or bends are smoothly and efficiently negotiated, without experiencing any significant vibration or chatter.

SUMMARY OF THE INVENTION

Keeping the above-mentioned needs in focus, it is a primary object of the present invention to provide an apparatus for use in a side flexing modular link conveyor system that overcomes the above-described limitations and disadvantages of the prior art.

An additional object of the invention is to provide an external guide assembly for such a conveyor system that contacts the external periphery of the conveyor belt and actively reduces the frictional drag force acting on the belt, particularly as a curve or bend is traversed.

A further object is to provide such an external guide assembly that is easily retrofitted onto existing conveyor systems.

Still another object is to provide such a conveyor system with an active external guide assembly formed of specialized rollers that both reduce frictional drag forces and enhance the stability of the belt, particularly as a curve or bend is traversed.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a conveyor system is provided with an external guide assembly that serves to reduce the frictional drag force experienced by a side-flexing modular link conveyor belt, particularly along curves or bends. As a result, more efficient motion of the conveyor belt that forms a component of the system is achieved. Improved operation, efficiency, and the resultant longer life comes primarily as a result of substantially reducing or eliminating the otherwise significant frictional drag force experienced by the belt as it traverses curves. This reduction is achieved through the use of a plurality of interconnected roller assemblies which form the external guide assembly, as described in further detail below.

As is well-known in the modern conveyor art, a side-flexing conveyor belt is formed by interconnecting a plurality of modular links. A complete description of a type of side-flexing belt, and an associated conveyor system, is disclosed in Applicant's U.S. Pat. No. 4,953,693 to Draebel, entitled, "Modular Link Conveyor System," the disclosure of which is incorporated herein by reference. For the disclosure of an internal guide assembly for active guiding of modular conveyors, reference is made to the copending patent application entitled "Reduced Drag Side Flexing Conveyor System", Ser. No. 09/025,467, filed Feb. 18, 1998, the disclosure of which is also incorporated herein by reference.

In accordance with an important aspect of the present invention, the external guide assembly is formed by interconnecting a plurality of active roller assemblies. The rollers provide for active or rolling lateral pressure for guiding support, as opposed to pure sliding guiding support that is provided by passive or static guide rails. In the preferred embodiment, the guide assembly is positioned external to the guide rails and, more particularly, along the inside of a curve or bend in the conveyor system adjacent to a passive guide rail of a type known in the art.

Preferably, each roller assembly comprises a first, upper roller for contacting the external face of the upper or production run of the belt, and a second, lower roller for similarly contacting the belt along the return run. Both rollers are rotatably mounted on support means, such as an upstanding spindle or other type of shaft. The rollers are preferably mounted on a single spindle, such that the peripheral surface of each roller provides a bearing surface for the respective run of the belt. The rolling contact allows the roller to move substantially friction free along the vertically depending side arm portion of each guide link. As should be appreciated, the upper roller of each assembly thus serves to actively guide the conveyor belt by preventing the compressed links from drifting or otherwise making any significant movement inwardly along the radius of the curve.

Advantageously, the upper roller serves to reduce the extent to which the guide links of the production run of the belt along the outside of the curve contacts the guide rail and concomitant frictional drag force created by this contact. As should be further appreciated, the lower roller serves to similarly guide and support the belt along the return run and provide a similar benefit. The significant reduction or elimination of the troublesome drag force permits the allowable speed of travel to be significantly increased. Moreover, the reduction in frictional drag force allows the belt to traverse a curve or bend in the conveyor system without being subject to excessive wear. The generation of frictional heat is also greatly reduced at any point in the system and particularly along the outside guide rail, which would normally be subjected to a plurality of deleterious hot spots which increase wear.

In the preferred embodiment, a plurality of roller assemblies are interconnected to form the active guide assembly, and are positioned externally of the conveyor along the inside of the curve. A series of articulated members are coupled together between adjacent pairs of roller assemblies using coupling means, such as the spindles or shafts described above. Since the articulated members are attached to the spindle in a pivotal relationship, the relative angular position between the roller assemblies can be selectively adjusted for attachment opposite the internal, passive guide rail. The adjustable nature of the external guide assembly advantageously allows the plurality of roller assemblies to adapt to a variety of different curves or lengths of curves in a conveyor system. Simple experiments allow the user to make any necessary adjustments to move each external roller assembly closer to, or farther away from, the inside guide rail to increase or decrease the extent of lateral pressure on the guide links of the conveyor belt.

In an alternate embodiment, both the upper and lower rollers are provided with a circumferential lip. This lip provides a bearing surface for the underside of the depending arm of the guide links forming the conveyor belt forward run. The lip similarly contacts the upper conveying surface of the guide links of the inverted belt during the return run. The contact surface provided by this lip helps provide a smooth operation and reduces vibrations and chatter in the belt, and is of particular benefit along sharp curves. As should be appreciated, the roller assembly is the sole bearing surface that contacts the external side surface of the guide links.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and, together with the description, serve to explain the principles of the invention. In the drawings:

FIG. 1 is a cutaway top plan view of a conveyor system including the external guide assembly of the present invention positioned along the inside of a curve;

FIG. 2 is a cross-section taken along line 2—2 of FIG. 1, showing the rolling contact established between the upper and lower rollers and the forward and return runs of the belt, respectively, and also illustrating the adjustable attachment means for securing a roller assembly to the guide rail;

Figure 3:
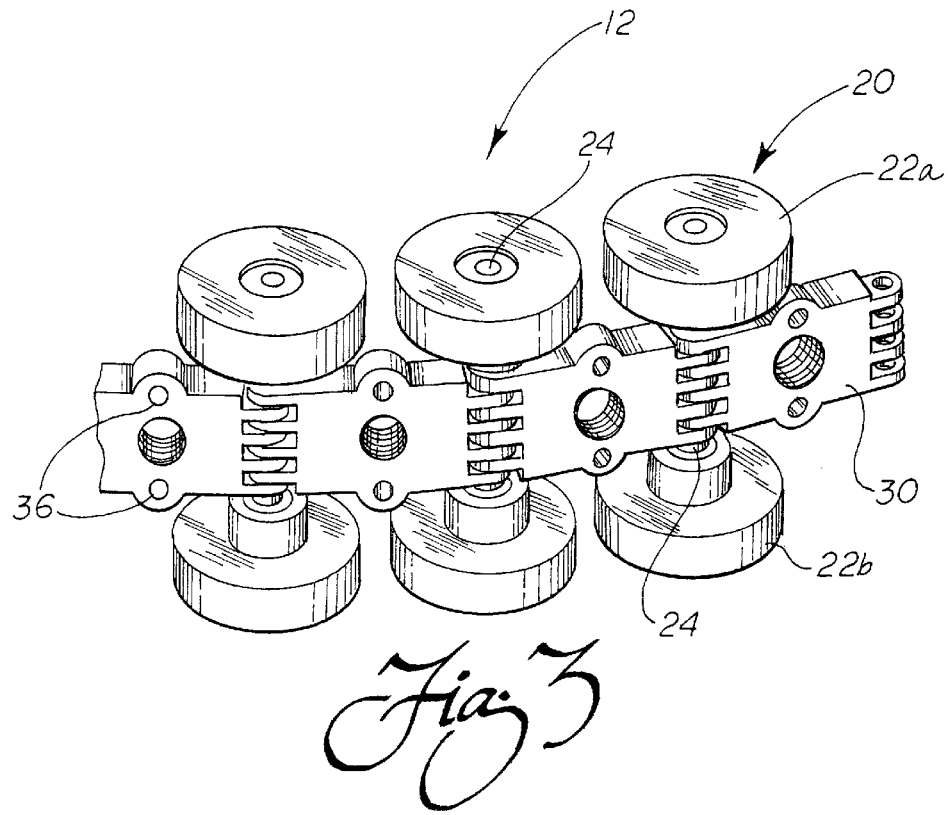
FIG. 3 is a partially cutaway perspective view showing the manner in which a series of articulated members interconnect to form the external guide assembly of the present invention.

Reference will now be made in detail to the present preferred embodiment of the invention, an example of which is illustrated in the accompanying drawings.

DETAILED DESCRIPTION OF THE INVENTION

Reference is now made to FIGS. 1 and 2 illustrating a cutaway view of a side flexing endless modular link conveyor system 10 of the present invention, including the external guide assembly 12 for reducing the frictional drag force acting on a modular link conveyor belt 14. As will become apparent after reviewing the description below, the system 10 with the external guide assembly 12 along the inside of the curve improves operational characteristics, and more particularly provides smooth and substantially drag free continuous motion for the belt. The guide assembly 12 is useful for a variety of degrees of curvature, including even relatively sharp bends is that heretofore had to be avoided by the conveyor designers.

For purposes of illustration, the system 10 is shown as having a curved section through a tight, 90° corner. The curve is defined by a pair of passive guide rails 16, 18 which serve to guide and support the belt 14 as it travels along the conveyor system 10. The action arrows positioned near the entry and exit cutaway lines in FIG. 1 denote the direction of travel of the belt 14, although it should be appreciated that the direction of travel can be reversed while still enjoying the reduced drag features provided by the external guide assembly 12. The belt 14 is driven by a drive means D, which may take the form of a typical sprocket/drive motor combination.

In the preferred embodiment, the active external guide assembly 12 is positioned adjacent to the inside passive guide rail 16, such as that forming a curve in the conveyor system 10. It is operative to reduce the frictional drag force resulting from the contact between the guide links of the belt and primarily the outer guide rail 18. More particularly describing the active guide assembly 12, one or more roller assemblies 20 positioned externally of the conveyor belt 14, are included. The roller assemblies 20 are positioned such that rolling contact is made with the external face of the guide links of the conveyor belt 14 along both the forward and return runs, thereby actively guiding the belt 14 along the curve.

Although it is contemplated that one roller assembly 20 may provide the active guiding function for the conveyor belt 14, the preferred embodiment of the guide assembly 12 includes a plurality of interconnected roller assemblies 20, which for purposes of illustration is shown as three. It should be appreciated that any number of roller assemblies 20 may by employed depending on the length of the curve, and/or the degree of curvature. As will be described in more detail below, the roller assemblies 20 forming the external guide assembly 12 are interconnected and secured along the inside passive guide rail 16. In this location, the enhanced reduction in frictional drag force on the outside passive guide rail 18 that is characteristic of the present invention is maximized.

Each roller assembly 20, and as best shown in FIG. 2, includes an upper roller 22a, a lower roller 22b, and a mounting means, which for purposes of illustration is an upstanding spindle 24 (shown in phantom) that extends through connecting interdigitated fingers. The rollers 22a and 22b are rotatably mounted on the spindle using low friction ball bearings (not numbered). This arrangement provides the desirable rolling contact between the periphery of the individual rollers 22a, 22b and the external side surface of the inside guide links, and thereby provide the low friction bearing surface desired. Each roller assembly 20 advantageously serves in concert with the others to stop the belt 14 from drifting inwardly along the curve. As a result, this action substantially reduces the deleterious frictional drag forces along the outside of the curve that otherwise would be acting on both the forward and return runs of the belt 14. This results in a significant improvement in system 10 operational characteristics, as well as a decrease in wear on system components and a concomitant increase in the service life of the belt 14.

As previously noted, the peripheral surface of each roller 22a, 22b provides a bearing surface for contacting the external face of the depending arm 25 of guide link 26 as the belt 14 traverses the curve. Therefore, it is important that low friction, rolling contact is maintained between these surfaces. It is contemplated that the individual rollers 22a, 22b are formed from UHMW plastic materials, such as for example, Nylon, high density polyethylene or any similar plastic material having a relatively high wear characteristic, as well as a high degree of lubricity with respect to the chosen link material. The tribological characteristics of the system 10 are enhanced by the latter feature since: (1) any slight up and down relative shifting movement does not induce drag; and (2) if desired a lip can be employed on the rollers 22a, 22b for up and down guiding without introducing significant friction, as will be described more in detail below with regard to FIG. 4.

To interconnect the roller assemblies 20 such that the desired rolling contact between the bearing surfaces of the rollers 22a, 22b and the side, guide links 26 of the belt 14 are consistently maintained along the curve, a plurality of interdigitating articulated members 30 are provided. As is described in more detail below, these articulated members 30 are supported by a pair of threaded shafts 32 extending through the inner passive guide rail 16. It should be appreciated that such a support system permits the external guide assembly 12 to be easily retrofitted to existing conveyor systems without a significant amount of effort, production downtime or significant additional expense.

To interconnect and provide support for the guide rails 16, 18, radial cross brackets 34 are also provided. Upstanding support members (not shown) may be secured to these cross brackets 32 for supporting the conveyor system 10 above the floor.

To further reduce the frictional drag acting on the belt 14, the guide tracks provided by the passive guide rails 16, 18 are provided with wear strips 28 formed of a low friction material (FIG. 2). For details on the use of such wear strips 28, the reader is referred to Applicant's issued U.S. Pat. No. 5,031,757, the disclosure of which is incorporated herein by reference.

As is specifically shown in FIG. 3, each articulated member 30 is provided with a pair of spaced apertures 36 adapted to receive the shafts 32 extending through the guide rail 16. Securing means, such as threaded nuts, are provided to hold the articulated members 30 in place, as well as to secure the radially-extending cross bracket 34 to guide rail 16 (see FIG. 4). It should be appreciated that the threaded shaft and nut combination permits adjustment of the position of each individual articulated member 30 relative to the guide rail 16. This advantageously allows the magnitude of radial pressure or force provided by the rollers 22a, 22b against the belt 14 to be finely adjusted. Through experimentation using thermal detection equipment, such as thermocouples attached to the rail 18 along the outside of the curve, the optimum position of the external guide assembly 12, as well as the individual roller assemblies may be determined to optimize the reduction in the frictional drag between the guide rail 18 and the outside links of the belt 14.

The operation of the system 10 including the external guide assembly 12 is best illustrated by viewing FIGS. 1 and 2 together. As the belt 14 traverses a curve in the conveyor system 10, the inner face of the depending arm 25 and inwardly projecting guide tab 27 of the guide link 26 are in sliding engagement with the wear strips 28 along both the forward and return runs, respectively (FIG. 2). As the belt 14 enters the curve, the outer surfaces of the depending arms 25 come into contact with the plurality of upper and lower rollers 22a, 22b of the external guide assembly 12 (see arcuate action arrows in FIG. 1). As the belt 14 continues along the curve, the modular links including the guide links 26, compress relative to one another along the inside curve and expand along the outside curve. It is contemplated that the size of the rollers relative to the links is such that several guide links 26 are contacting the rollers 22a, 22b at any one time. It is to be understood that the size of the rollers 22a, 22b, having a greater or lesser area of rolling contact, depends on the speed of the belt, the size of the links, the radius of the curve, the clearance desired beside the conveyor and various other factors, all being within the terms of the present invention.

With the use of the external guide assembly 12, instead of drifting inwardly and creating frictional hot spots between the inside face of the depending arm 27 of the guide links and the wear strips 28 on the outer guide rail 18, the belt 14 is now actively guided through the curve by the rollers 22a, 22b. As should be appreciated, the bearing surface provided by rollers 22a, 22b eliminates the tendency of the belt 14 to move inwardly. Importantly, the rolling contact between the rollers 22a, 22b and the guide links 26 of the belt 14 adds no significant additional friction into the system 10. This is because the rolling contact between the rollers 22a, 22b and the external surface of the guide links 26 provides substantially frictionless guiding action. Thus, the external guide assembly 12 advantageously provides a simple and cost effective solution to reduce the frictional drag force experienced by the belt 14, particularly along the outside of a curve.

Figure 4:
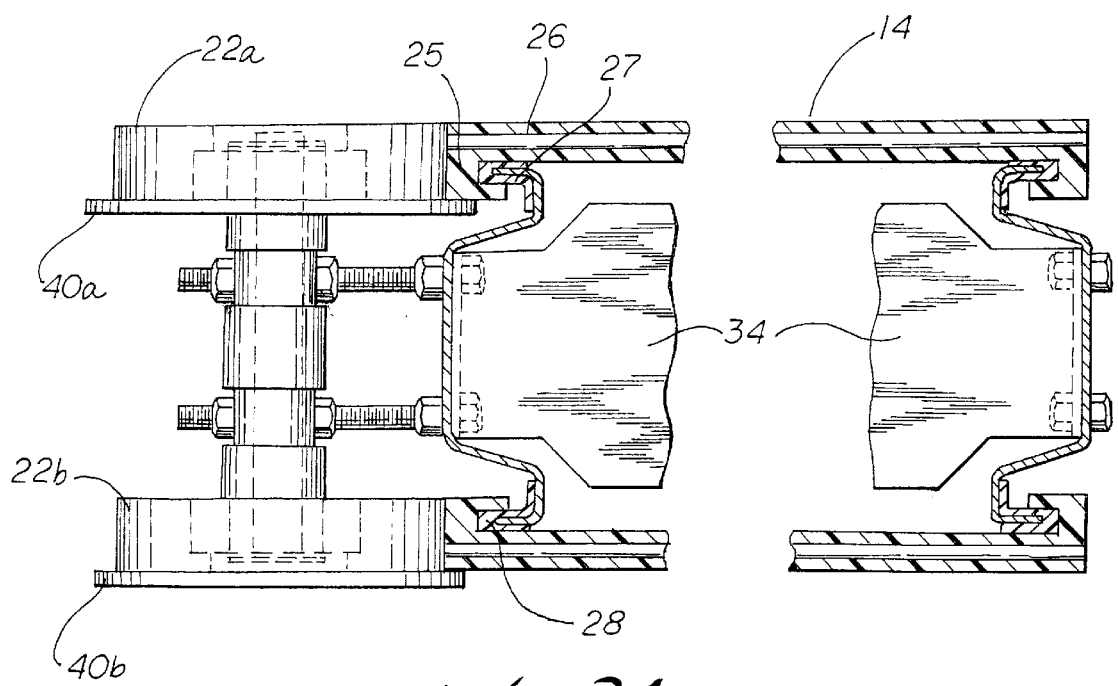
FIG. 4 is a cross-sectional view similar to that shown in FIG. 2, but illustrating an alternate embodiment in which specialized upper and lower rollers include a peripheral lip for assisting in supporting the belt during travel along both the forward and return runs, respectively.

An alternate embodiment of the external guide assembly 20 of the present invention is illustrated in FIG. 4. The important aspect of this embodiment is the provision of peripheral lips 40a, 40b extending circumferentially along the lower portion of both rollers 22a, 22b. Thus, in addition to providing a bearing surface for the inside face of the guide links 26 along both the forward and return runs of the belt 14, the lips 40a, 40b now further provide a bearing surface for the underside of the inwardly projecting guide tab 27 along the forward run and the upper surface of the inverted guide link 26 along the return run. As should be appreciated, the bearing surface provided by these peripheral lips 40a, 40b further assists in supporting the belt 14 as a curve is traversed. This added support is helpful in reducing the tendency of the belt 14 to vibrate or chatter due to the competing tension and compression forces presented as a curve is traversed. This alternate embodiment is of particular benefit where the linear speed of the belt 14 is to be maintained at a high level for extended periods. As mentioned above, the rolling contact between the low friction surface of the lips 40a, 40b and the respective low friction surfaces of the guide links 26 adds no substantial frictional drag force to further inhibit travel of the belt 14 through the system 10.

It is to be understood that the external guiding concept of the present invention can be combined with other approaches, such as the internal guiding, as disclosed in Applicant's pending U.S. patent application Ser. No. 09/025,467, as mentioned above.

In summary, a conveyor system 10 having an external guide assembly 12 to reduce the frictional drag force on the modular belt 14 and improve operating characteristics is provided. The guide assembly 12 is formed of one or more roller assemblies 20 having upper and lower rollers 22a, 22b which provide active guidance to the belt 14 as a curve is traversed (see FIGS. 1 and 2). By eliminating the ability of the belt 14 to drift inwardly along the radius of the curve and providing rolling contact, the rollers 22a, 22b actively serve to greatly reduce the frictional drag force normally experienced between the guide rails 16, 18 and the guide links 26 of is the belt 14, particularly along the outside of a curve. This in turn reduces heat build-up and component wear, as well as serving to eliminate vibration and chatter. A series of articulated members 30 are provided to interconnect the roller assemblies 20 which form the guide assembly 12 along the inside guide rail 16. The interdigitating joints between these articulating members permit the relative angular position of each to be selectively adjusted to fit a given curve (see FIG. 3). In an alternate embodiment, the rollers 22a, 22b are provided with lower peripheral lips which assist in supporting and guiding the edges of the belt 14 along the curve (see FIG. 4).

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An apparatus for assisting in actively guiding a side-flexing, endless modular link conveyor belt along first and second guide rails defining forward and return runs for the belt, comprising:

at least one roller assembly mounted external to one of said first and second guide rails;

said belt including a plurality of guide links positioned along the sides of said belt and engaging said first and second guide rails, each said guide link having a depending arm;

said roller assembly including first and second rollers contacting and engaging said depending arm on each of said guide links along the forward and return runs, respectively, said rollers supported by a common mounting including an upstanding spindle, whereby low friction rolling contact between said first and second rollers and said depending arms on said respective guide links actively guides and reduces the friction on the belt.

2. The apparatus of claim 1, wherein said first guide rail is positioned along and forms an inside curve.

3. The apparatus of claim 1, wherein is provided a plurality of roller assemblies and a pair of articulated members having interdigitating fingers for receiving the spindle for each pair of first and second rollers; the hinged joint formed by said members allowing the relative position to be adjusted.

4. The apparatus of claim 3, wherein said articulated members further include at least one aperture for receiving a support shaft extending through said first guide rail, said support shaft serving to hold said articulated members in position.

5. The apparatus of claim 1, wherein said first and second rollers are provided with a peripheral lip for assisting in supporting said guide links.

6. A modular link conveyor system, comprising:

a plurality of modular links forming a side-flexing, endless conveyor belt having a forward and a return run, said conveyor belt including guide links having an outer depending arm along the sides thereof, said depending arm including an inwardly extending transverse tab;

at least one external roller assembly including a first roller and a second roller mounted on an upstanding spindle and each having a peripheral lip, said rollers contacting an external face of said depending arm along an inside curve on the forward and return runs, respectively, and said peripheral lip at least partially engaging said inwardly extending transverse tab to assist in supporting said conveyor belt; and drive means to impart motion to said conveyor belt, whereby said roller assemblies reduce the frictional drag force acting on said conveyor belt as said inside curve is traversed.

7. The conveyor system of claim 6, wherein is further provided:

a first passive guide rail for engaging said depending arm and said inwardly projecting transverse tab along a first side of said conveyor belt;

an second passive guide rail for engaging said depending arm and said inwardly projecting tab along a second side of said conveyor belt.

8. The conveyor system of claim 7, wherein said first passive guide rail defines an inside curve in said conveyor system and said second passive guide rail defines a corresponding outside curve.

9. The conveyor system of claim 6, wherein said first and second rollers are provided with a peripheral lip for assisting in supporting said side links.

10. The conveyor system of claim 6, wherein each of said roller assemblies includes corresponding articulated members for coupling a plurality of said roller assemblies together, whereby said articulated members allow the adjustment of the relative position of said plurality of roller assemblies to adapt to said inside curve.

11. An apparatus for assisting in actively guiding a side-flexing, endless modular link conveyor belt having a forward and a return run and at least one guide rail, comprising:

a plurality of roller assemblies mounted external to said belt including upper and lower rollers supported by an upstanding spindle for contacting the belt along the forward and return runs, respectively; and at least one pair of articulated members having interdigitating fingers for receiving the spindle supporting each pair of upper and lower rollers, whereby low friction rolling contact between said first and second rollers and the belt actively reduces friction and said articulating members form a hinged joint that allows the relative position of the roller assembly to be selectively adjusted.

12. The apparatus of claim 11, wherein said articulated members further include at least one aperture for receiving a support shaft extending through the at least one guide rail of the conveyor, said support shaft serving to hold said articulated members in position.

13. The apparatus of claim 11, wherein said upper and lower rollers are provided with a peripheral lip for assisting in supporting said conveyor belt.

* * * * *